(12) United States Patent
Vu

(10) Patent No.: US 9,439,479 B1
(45) Date of Patent: Sep. 13, 2016

(54) SEAT BELT REMINDER COVER

(71) Applicant: Phuong Anh T. Vu, Cocoa Beach, FL (US)

(72) Inventor: Phuong Anh T. Vu, Cocoa Beach, FL (US)

( * ) Notice: Subject to any disclaimer, the term of this patent is extended or adjusted under 35 U.S.C. 154(b) by 70 days.

(21) Appl. No.: 14/473,460

(22) Filed: Aug. 29, 2014

(51) Int. Cl.
| | | |
|---|---|---|
| *B60R 22/00* | (2006.01) | |
| *A44B 11/25* | (2006.01) | |
| *G09F 3/08* | (2006.01) | |
| *A47G 1/06* | (2006.01) | |
| *B60R 11/00* | (2006.01) | |

(52) U.S. Cl.
CPC ......... *A44B 11/2576* (2013.01); *A47G 1/0638* (2013.01); *B60R 22/00* (2013.01); *G09F 3/08* (2013.01); *B60R 2011/0063* (2013.01)

(58) Field of Classification Search
CPC .......... A44B 11/2576; A44B 11/2511; B60R 22/00; B60N 2/265
USPC .............................. 24/633; 297/482, 487, 488
See application file for complete search history.

(56) References Cited

U.S. PATENT DOCUMENTS

| | | | |
|---|---|---|---|
| 3,484,908 A | 12/1969 | Lamb | |
| 4,624,033 A | 11/1986 | Orton | |
| 4,731,912 A | 3/1988 | Boriskie | |
| 4,901,407 A | 2/1990 | Pandola | |
| 4,939,824 A | 7/1990 | Reed | |
| 4,944,530 A | 7/1990 | Spurrier | |
| 4,961,251 A | 10/1990 | Smith | |
| 5,463,369 A * | 10/1995 | Lamping | B60R 22/48 280/801.1 |
| 5,791,608 A * | 8/1998 | Nielsen | B44D 3/125 206/362.4 |
| 6,041,480 A * | 3/2000 | White | A44B 11/2576 24/487 |
| 6,105,219 A * | 8/2000 | Beadle | A44B 11/2576 24/579.11 |
| 6,138,331 A * | 10/2000 | Powers | A44B 11/2576 24/306 |
| 6,489,889 B1 | 12/2002 | Smith | |
| 6,675,966 B1 * | 1/2004 | Ray | A46B 17/04 206/362.4 |
| 6,769,157 B1 | 8/2004 | Meal | |
| 8,063,788 B1 | 11/2011 | Morningstar | |
| 8,161,900 B2 | 4/2012 | Munson | |
| D662,277 S * | 6/2012 | Dorsey | D2/639 |
| 8,393,061 B2 | 3/2013 | McGlynn | |
| 8,395,511 B2 | 3/2013 | Desjardins | |
| 8,408,156 B2 | 4/2013 | Banda | |
| 2005/0091892 A1 | 5/2005 | Dang | |
| 2007/0220793 A1 | 9/2007 | Mappes | |
| 2008/0179936 A1* | 7/2008 | Mirmikidis | B64D 11/062 297/482 |
| 2012/0007741 A1 | 1/2012 | Laffey | |
| 2013/0082831 A1 | 4/2013 | Byrne | |
| 2013/0106598 A1 | 5/2013 | Silveira | |
| 2014/0077943 A1 | 3/2014 | Bloukos | |

OTHER PUBLICATIONS

National Highway Traffic Safety Administration, U.S. Department of Transportation, Reducing the Potential for Heat Stroke to Children in Parked Motor Vehicles: Evaluation of Reminder Technology, Jul. 2012, 42 pages.
Car Seat Angel on Board: Forget Me Not, Car Seat Angel—A Visual Alert "Child in Car Seat" Reminder, 2014, http://www.carseatangel.com/Welcome.html, 3 pages.

* cited by examiner

*Primary Examiner* — Cassandra Davis
(74) *Attorney, Agent, or Firm* — Brian S. Steinberger; Law Offices of Brian S. Steinberger, P.A.

(57) ABSTRACT

Devices, apparatus, systems and methods for providing an attachable cover with flap and a detachable fastener such as a magnet for covering the depressible release button on a driver's seat belt buckle to block access to the release button as a reminder to the driver that a child, toddler or baby is in the vehicle. The cover can further include a decorative ornament, picture and/or photograph of a child, baby or toddler to further remind a driver that a child, baby or toddler being in the vehicle.

11 Claims, 11 Drawing Sheets

SEAT BELT REMINDER COVER

FIELD OF INVENTION

This invention relates to seat belts, and in particular to devices, apparatus, systems and methods for providing an attachable cover with flap and magnet for covering the depressible release button on a driver's seat belt buckle to block access to the release button as a reminder to the driver that a child, toddler or baby is in the vehicle.

BACKGROUND AND PRIOR ART

In the summer months, there is increase in incidents of where children, especially toddlers and babies are killed by being left buckled in car seat on hot days. A vehicle such as a car can rapidly heat up to over 100 C degrees when the windows are closed and the outside temperature is approaching 90 degrees or more. A few dozen children, toddlers, and babies die unnecessarily every year when the caregiver, such as a parent forgot their child in the vehicle.

Various types of devices have been proposed over the years that include pressure sensors on the child car seats that have varying degrees of electronics. Other types of sleeves have been proposed that generally do not work for their intended use, to be a simple reminder to the driver to check for a child still being left in the car.

Thus, the need exists for solutions to the above problems with the prior art.

SUMMARY OF THE INVENTION

A primary objective of the present invention is to provide devices, apparatus, systems and methods for providing an attachable cover with flap and magnet for covering the depressible release button on a driver's seat belt buckle to block access to the release button as a reminder to the driver that a child, toddler or baby is in the vehicle.

A secondary objective of the present invention is to provide low tech devices, apparatus, systems and methods that remind drivers that child, toddler or baby is left in the vehicle.

A third objective of the present invention is to provide low tech devices, apparatus, systems and methods that remind drivers that child, toddler or baby is left in the vehicle that can include a photograph of the child, toddler or baby as the reminder.

A fourth objective of the present invention is to provide devices, apparatus, systems and methods for providing an attachable cover with a decorative ornament that overlays the release button in a driver's seat belt buckle as a reminder to the driver that a child, toddler or baby is in the vehicle.

A fifth objective of the present invention is to provide devices, apparatus, systems and methods for providing an attachable cover with a picture or photograph that overlays the release button in a driver's seat belt buckle as a reminder to the driver that a child, toddler or baby is in the vehicle.

A sixth objective of the present invention is to provide devices, apparatus, systems and methods for providing an attachable cover with a sound effects button that overlays the release button in a driver's seat belt buckle as a reminder to the driver that a child, toddler or baby is in the vehicle.

A preferred embodiment of the seat belt reminder cover device, can include a base adaptable for attachment to a buckle portion on a seat belt, a flap extending from the base toward the metal tongue portion of the seat belt, and a detachable fastener such as a magnet that is adaptable for attaching the flap to a metal tongue portion on the seat belt, wherein the flap is able to block access to a release button on the buckle portion.

The base and flap can be from a fabric material. The magnet can be pre-attached to the flap. The cover device can include an ornament attached to the flap. The cover device can include a picture of a child attached to the flap. The cover device can include a photograph of a child attached to the flap.

The cover device can include a picture of a child attached to the base. The cover device can include a photograph of a child attached to the base.

The cover device can include a sound effect transmitter on the flap that emits a sound effect when activated.

The base of the cover can include opposite ends having fasteners that wrap the base about the buckle portion of the seat belt. The fasteners can be hook and loop fasteners. The fasteners can be snap fasteners. The fasteners can be a peel and stick fastener for attaching the base to the buckle portion.

The flap can use other types of detachable fasteners, such as but not limited to hook and loop fasteners, snaps, peel and stick tape, and the like.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
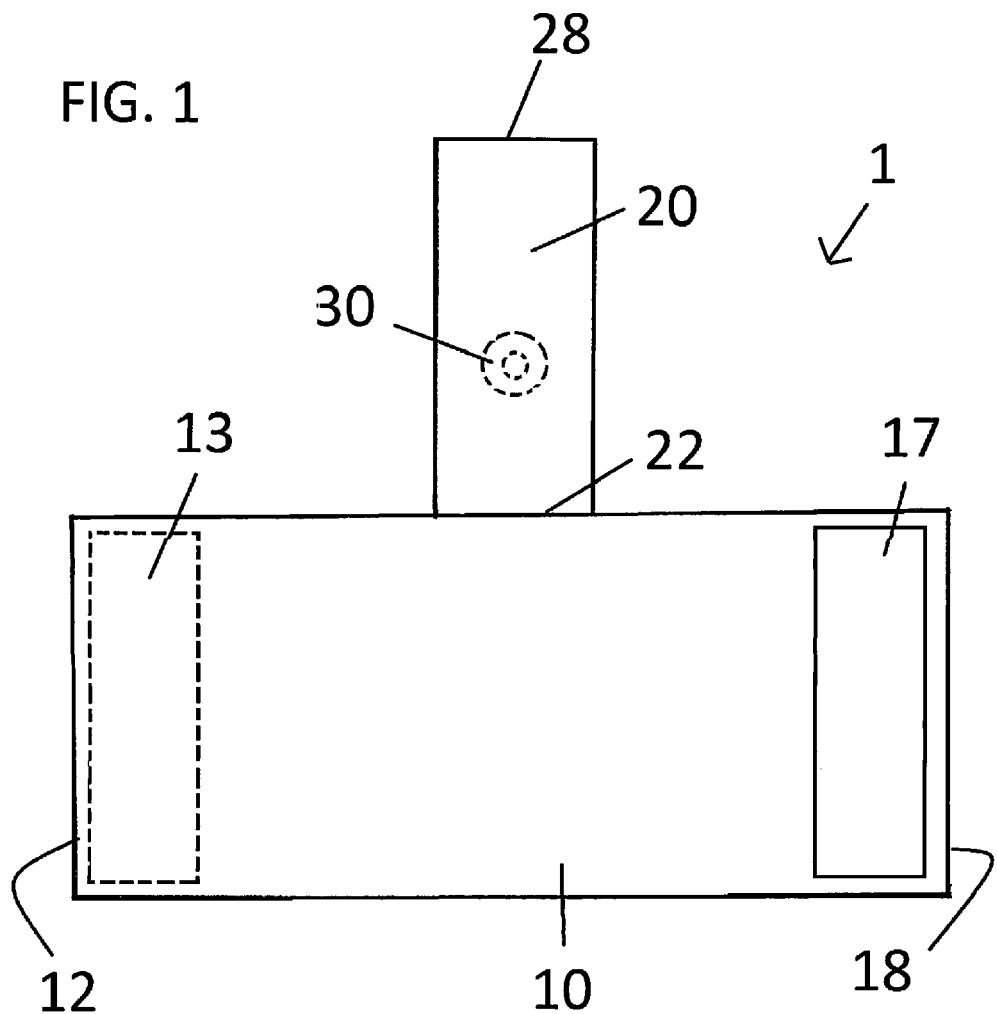
FIG. 1 is a top view of the novel attachable/detachable cover.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation. In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
1 Attachable/detachable cover
10 base of cover
12 left end
13 left fastener (hook and loops, snaps, button)
17 right fastener (hook and loops, snaps, button)
18 right end
20 flap
22 root end of flap
28 outer end of flap
30 detachable fastener, such as a magnet
40 ornament on flap end
100 seat belt
110 male latch
114 tongue
115 catch opening in tongue
120 buckle
130 Depressible button
135 female slot for receiving male latch
140 ornament
150 flap mounted picture
155 buckle mounted picture
160 depressible sound transmitter
165 circuit inside sound transmitter
170 peel and stick fastener(s)

FIG. 1 is a top view of the novel attachable/detachable cover 1 which can be formed from a flexible material such as fabric, and the like. Alternatively, other types of material, such as but not limited to cloth, nylon, vinyl, plastic, rubber, and the like, and combinations thereof can be used.

The cover 1 can have a base 10 with left end 12 and left fastener 13, a right end 18 with a right fastener 17 and a flap 20 that can extend generally up from a mid portion of the base 10. The fasteners 13, 17 can be hook and loop fasteners, such as VELCRO®. Alternatively, the base fasteners can be other types of fasteners, such as but not limited to snaps, buttons, and the like. The flap 20 can have a root end adjacent to a midportion of the base 10 and an outer end 28, with a detachable fastener such as a magnet 30 generally therebetween.

Figure 2:
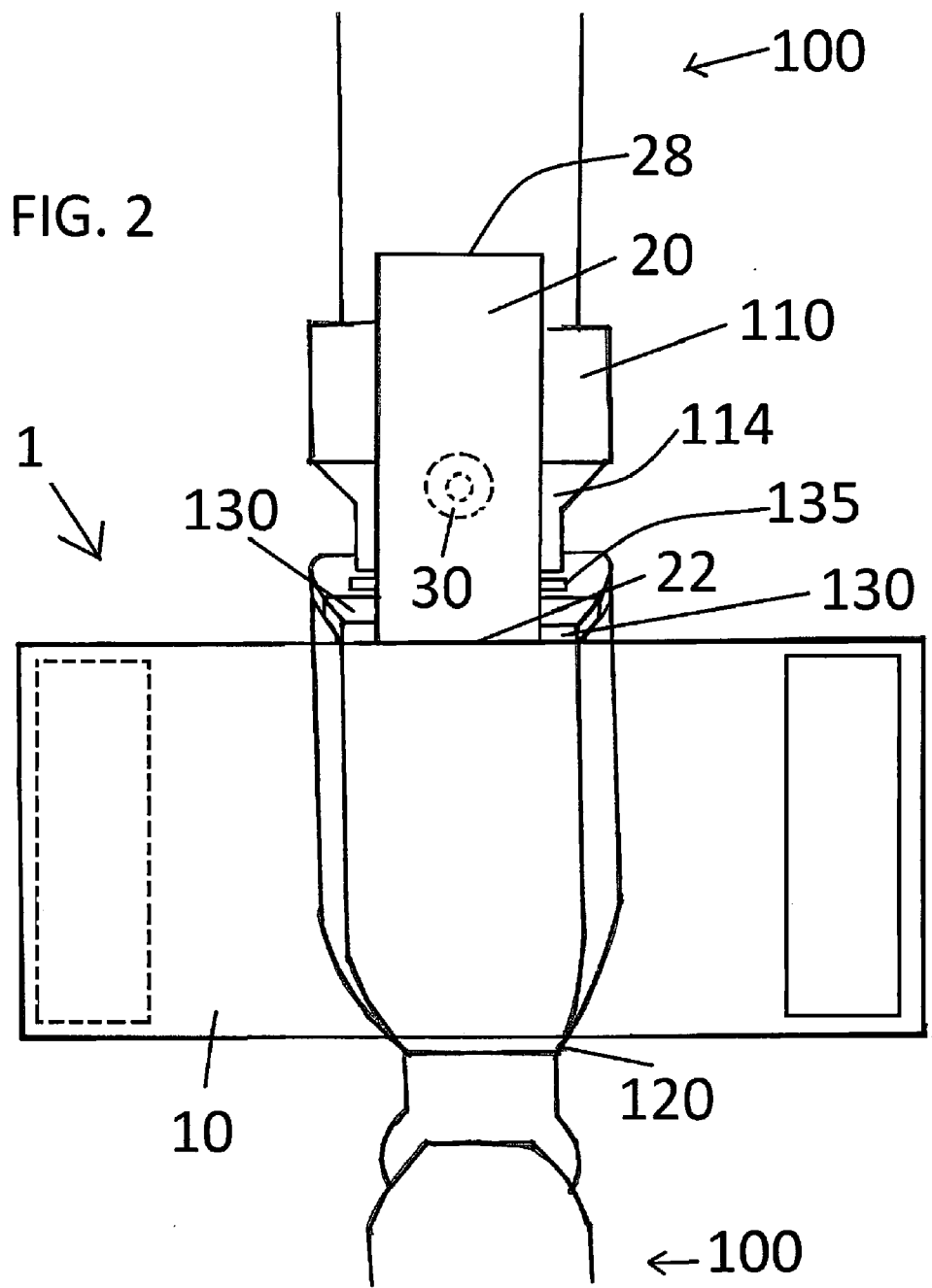
FIG. 2 is another top view of the cover of FIG. 1 ready to be attached about a buckle portion of a seat belt.
Figure 3:
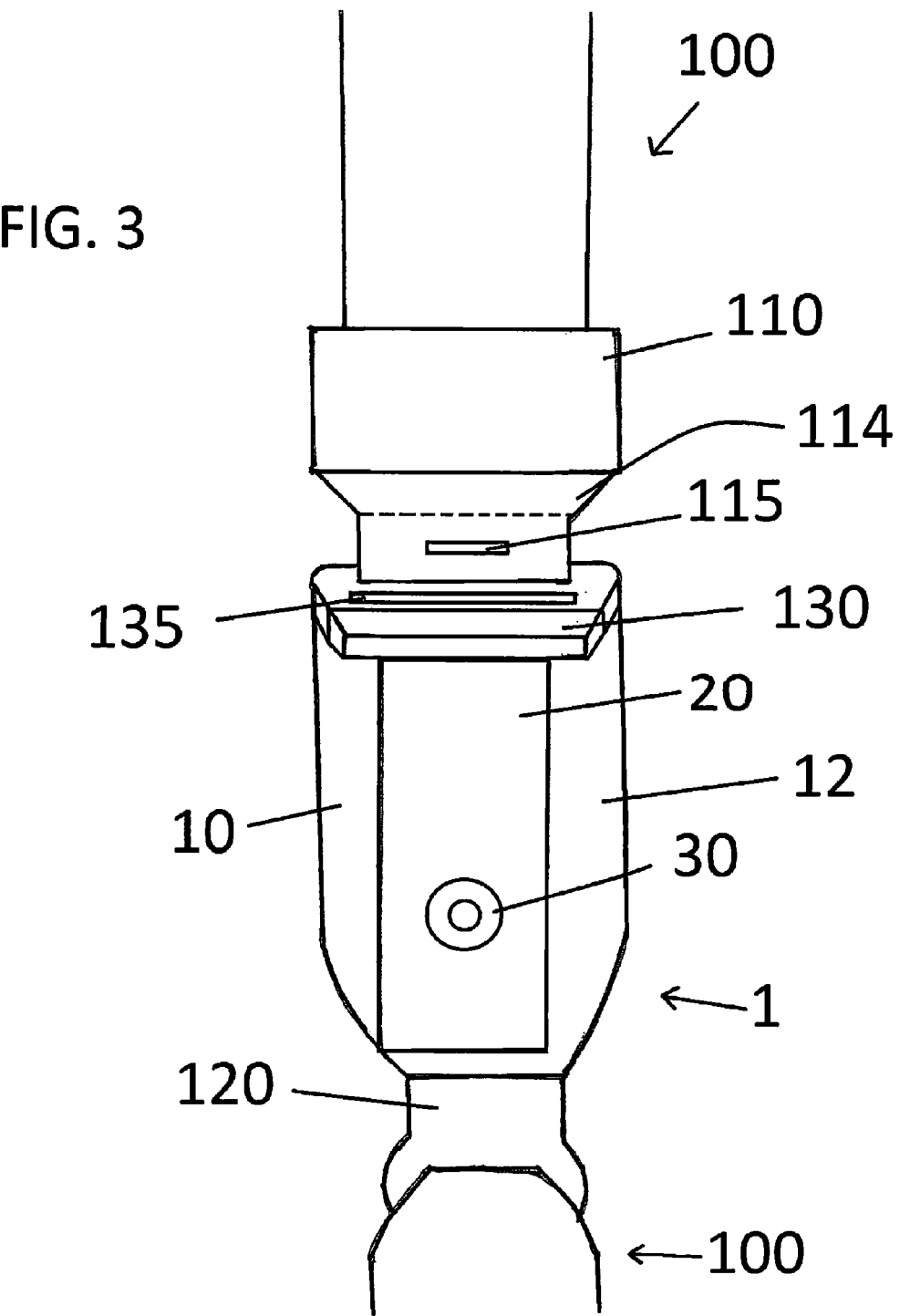
FIG. 3 shows the cover of the preceding figures attached about the buckle portion of the seat belt with the flap bent back before the male latch tongue on the seat belt is ready to be buckled.

FIG. 2 is another top view of the cover 1 of FIG. 1 ready to be attached about a buckle portion 120 of a seat belt 1. FIG. 3 shows the cover 1 of the preceding figures attached about the buckle portion 120 of the seat belt with the flap 20 bent back before the male latch tongue 114 on the seat belt 100 is ready to be buckled.

Figure 4A:
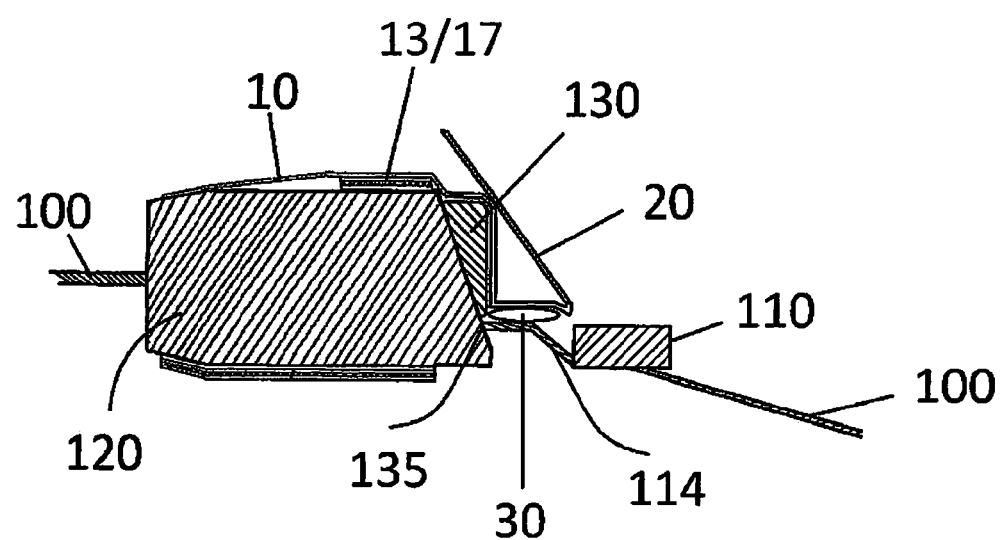
FIG. 4A is a side view of FIG. 3 with the latch tongue inserted into the side slot on the buckle portion with magnet holding the flap over the side depressible button.
Figure 4B:
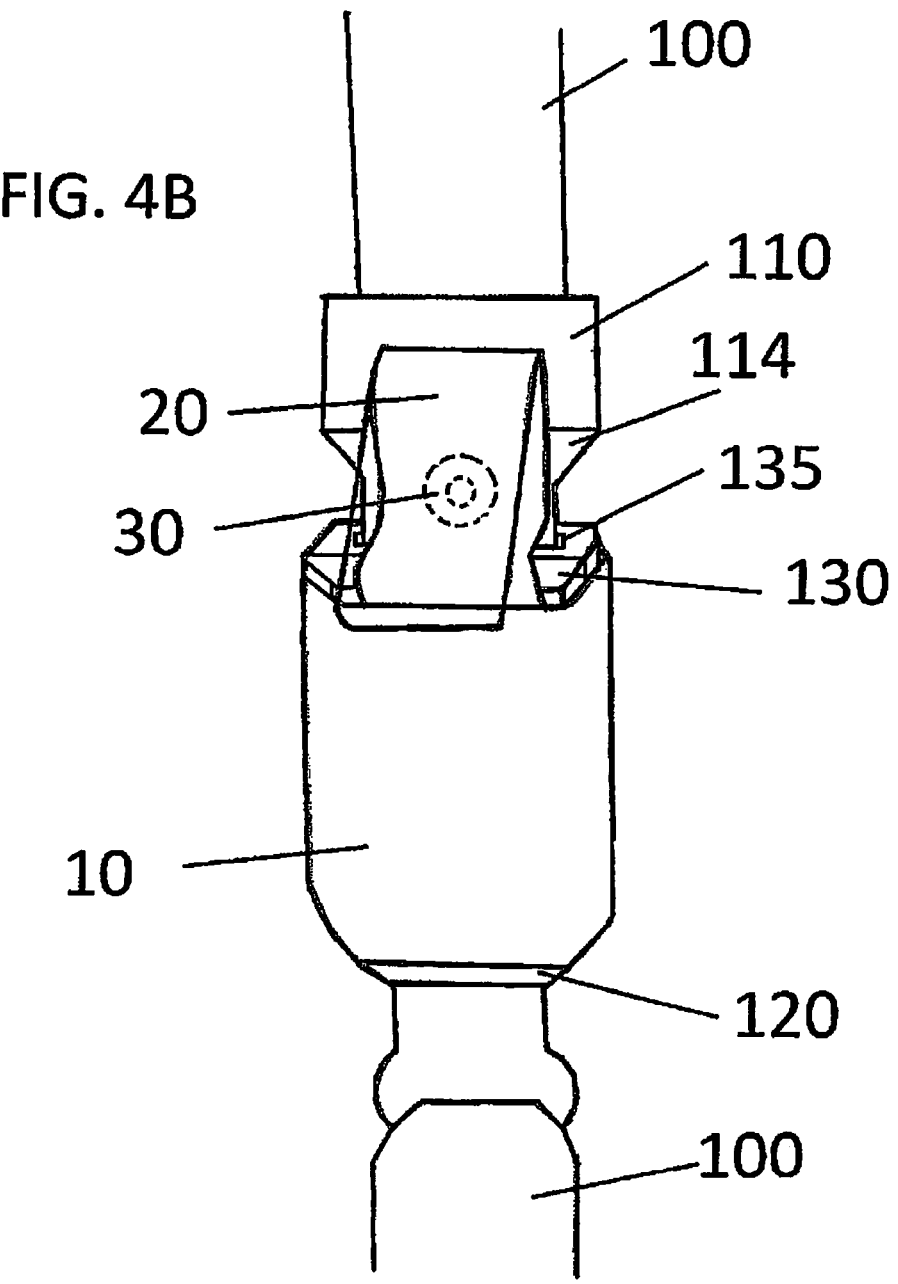
FIG. 4B is a top view of FIG. 4A showing the cover attached to the buckle portion and the flap blocking access to the side depressible button.

FIG. 4A is a side view of FIG. 3 with the latch tongue 114 inserted into the side slot 135 below the depressible button 130 on the buckle portion 120 with the magnet 30 holding the flap 20 over the side depressible button 130. FIG. 4B is a top view of FIG. 4A showing the cover 1 attached to the buckle portion 120 and the flap 20 blocking access to the side depressible button 130.

Referring to FIGS. 1-4B, the novel cover 1 can be used in a vehicle to remind the driver that a baby, toddler or child is in the car. The base 20 of the cover 1 can be wrapped about a buckle portion 120 of a driver's seatbelt 100 where the fasteners 13, 17 can secure the base 20 of the cover 1 to the buckle portion 120.

Next the flap 20 can be bent toward the male latch 110 with the magnet 30 causing the flap 20 to be pressed adjacent to the metal latch tongue 114. In this position, the flap 20 blocks the driver's access to the release button 130 on the buckle portion 130.

The novel cover 1 can be used after securing a child, baby or toddler in a child seat, and driver gets into the driver seat and buckles his own seat belt 100. After inserting the seat belt tongue 114 in the socket 135 of the buckle portion 120, the driver sets the reminder by flipping up the flap 20 so that the flap 20 magnetically attaches to exposed metal portion of the tongue 114 by the magnet 30. The flap 20 can be kept in open position if no reminder is needed.

When the driver reaches his destination, the driver can reach down to unbuckle his seat belt 100. Instead of touching and pressing on the release button 130 on the seat belt buckle portion 120, the driver can touch the attached flap 20 which reminds the driver that a child, baby or toddler is still in the vehicle.

Figure 5:
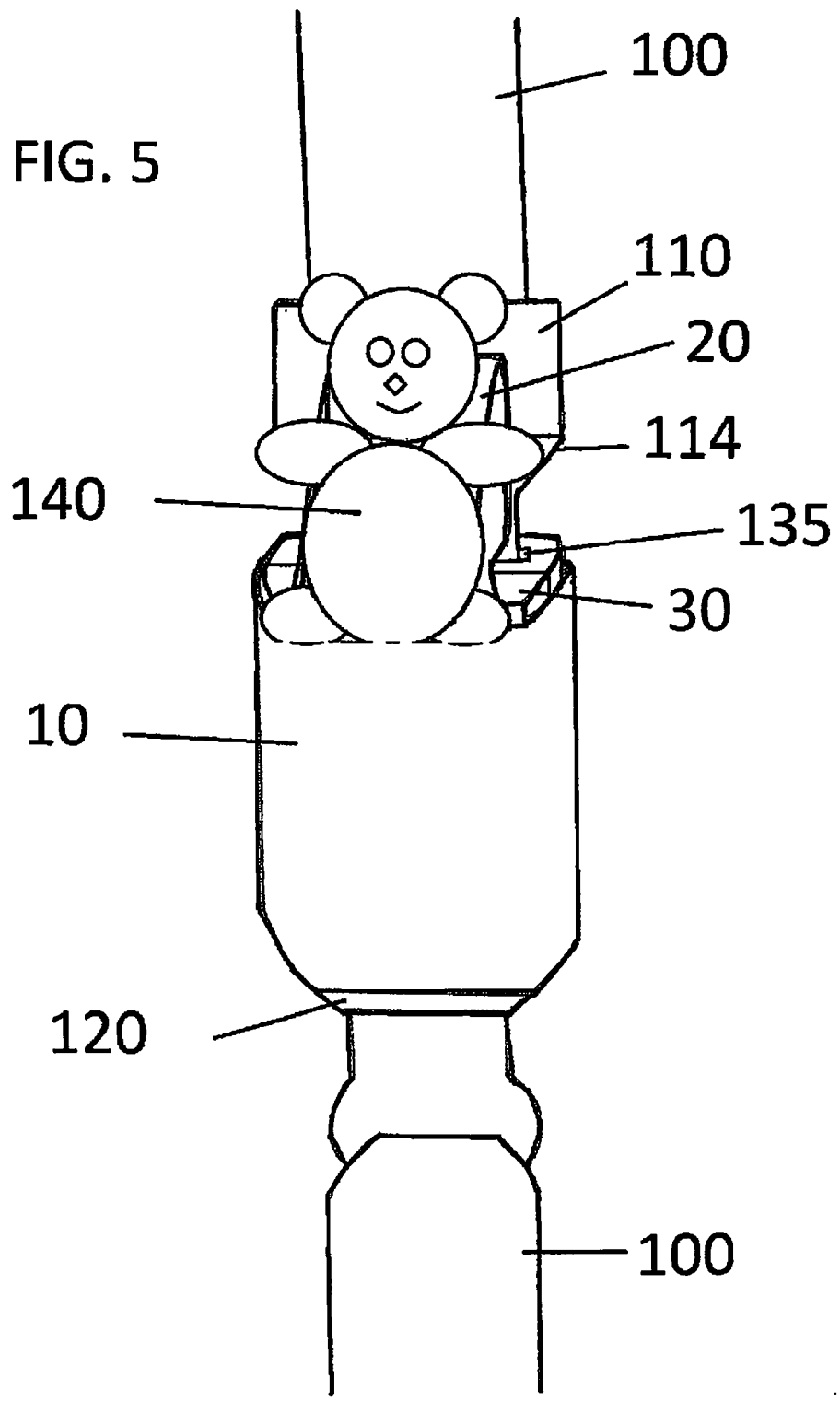
FIG. 5 is a top view of another embodiment of the preceding figures with an ornament on the flap, which further blocks access to the flap covered button.

FIG. 5 is a top view of another embodiment of the preceding figures with an ornament 140 on the flap 20, which further blocks access to the flap covered button 130. The flap 20 can include a stiff end portion extending from the magnet 30 to the end that prevents the driver from pressing on the release button. Both the stiff end portion and the ornament 150 can also prevent access to the release button 130 as well as be used for decoration.

Figure 6:
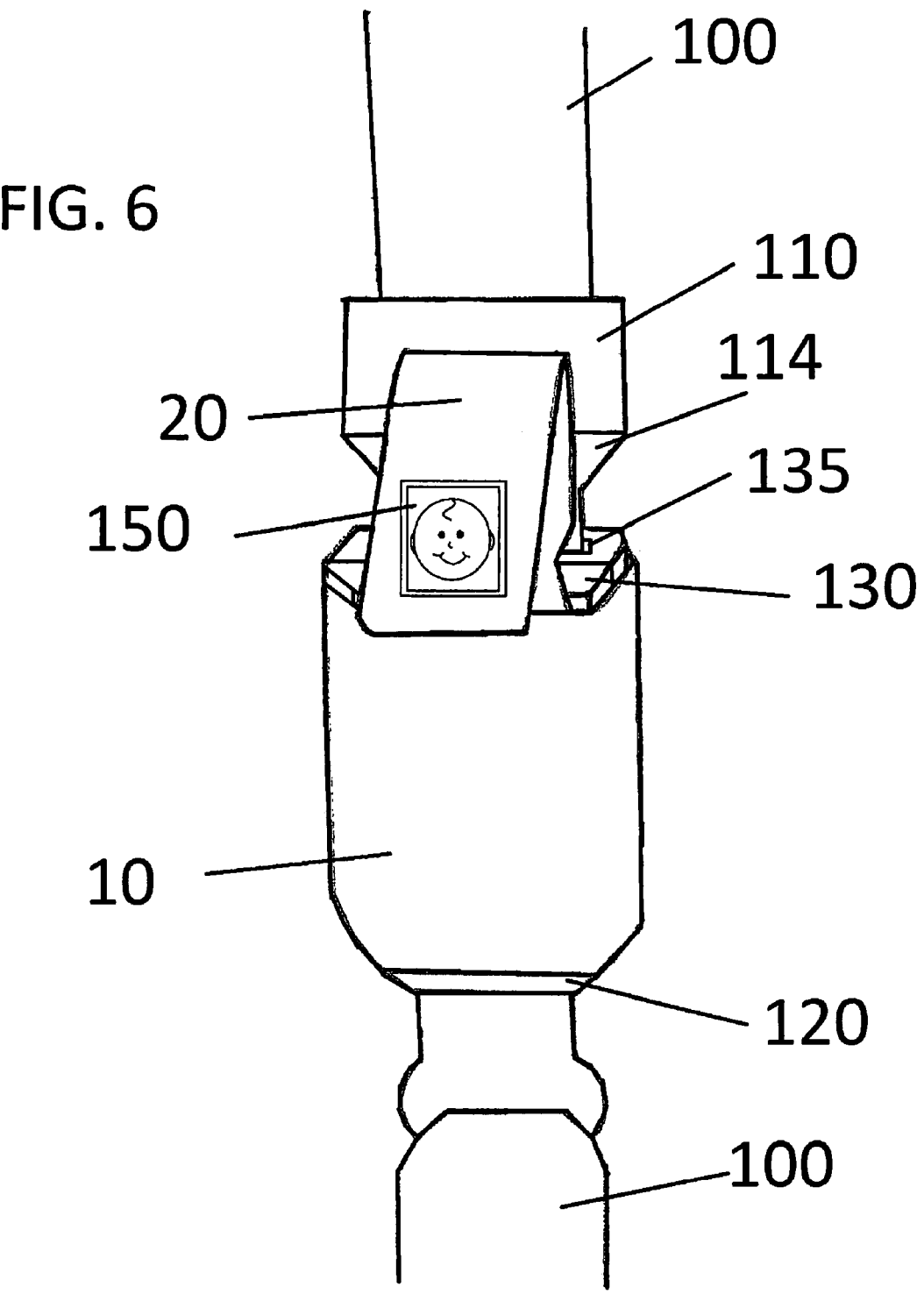
FIG. 6 is a top view of another embodiment of the preceding figures with a picture/photograph on the flap which further reminds the user of a child, baby or toddler inside the vehicle.

FIG. 6 is a top view of another embodiment of the preceding figures with a picture/photograph 150 on the flap 20 which further reminds the user of a child, baby or toddler inside the vehicle. The picture/photograph 150 can be in a translucent sleeve so that the picture/photograph can be easily changed out as desired over time.

Figure 7:
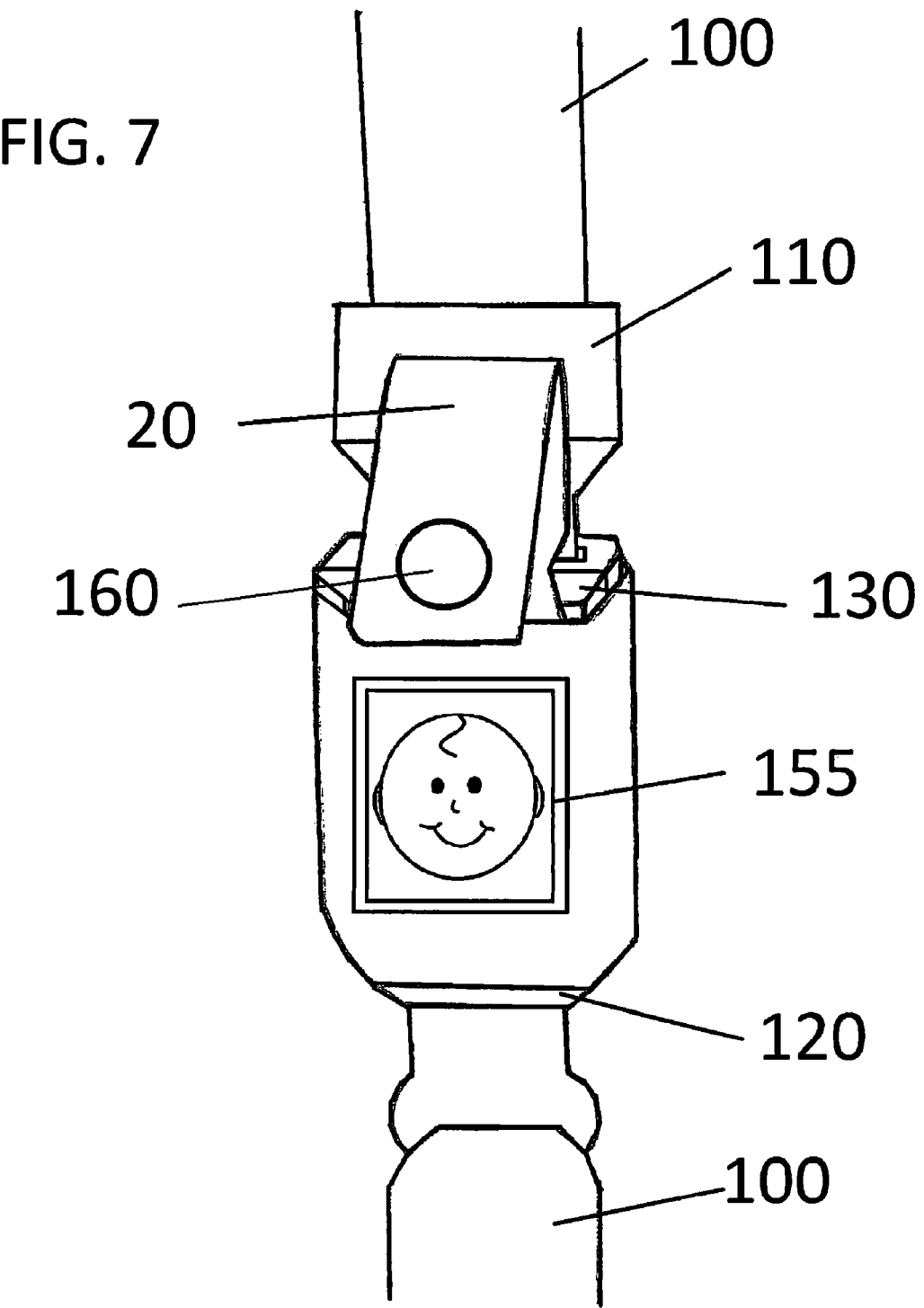
FIG. 7 is a top view of another embodiment of the preceding figures with a picture/photograph on the buckle portion which further reminds the user of a child, baby, or toddler inside of the vehicle as well as a sound effect button on the flap.

FIG. 7 is a top view of another embodiment of the preceding figures with a picture/photograph 155 on the flap base 20 on the buckle portion 120 which further reminds the user of a child, baby, or toddler inside of the vehicle.

Therefore, there is no need to remove the reminder cover from the buckle portion 120 when not in use since the cover can include a see through window for inserting a picture of a baby.

Figure 8:
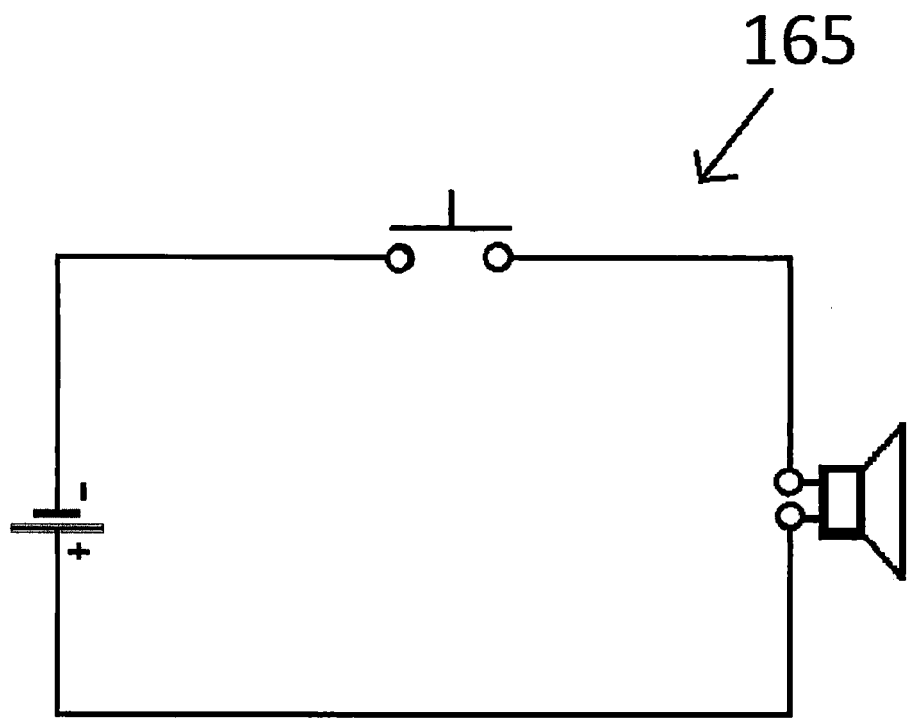
FIG. 8 is a schematic of circuitry inside of the sound effect button of FIG. 7.

Additionally or alternatively, a sound effect button 160 can be used on the flap 20. The sound effect button 160 can also cause tactile, visual, and/or audio indicator to further remind the driver and/or front seat passenger that a child, baby or toddler is in the vehicle. FIG. 8 is a schematic of circuitry 165 inside of the sound effect button of FIG. 7, which can include a battery source, switch (depressible activated) and speaker. Light sources, such as an LED (light emitting diode) can also be used or alternatively be used.

The audio reminder button 160 can be included on the cover 1 to play a recordings, and the like, such as but limited to playing a recording that states "Baby is in the car", music or any other audio sound. Audio reminder button 160 can also be activated when the driver presses, attaches, and/or pulls out the flap 20. To unbuckle his seat belt 100 the driver pulls the magnetically attached flap 20 out to access the seatbelt release button 130.

Figure 9:
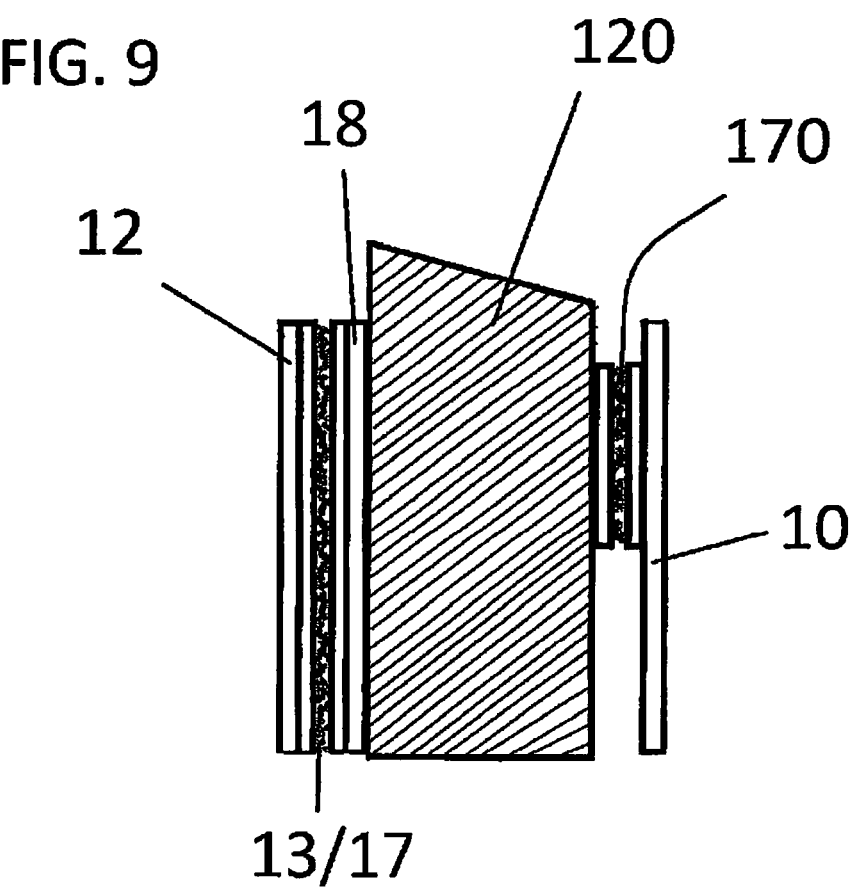
FIG. 9 is a side cross-sectional view of using interior peel and stick fasteners inside the base portion of the cover for directly attaching the base of the preceding Figures to the buckle portion.

FIG. 9 is a side cross-sectional view of using interior peel and stick fasteners 170 inside the base portion 10 of the cover 1 for directly attaching the base 20 of the preceding Figures to the buckle portion 120. The peel and stick fastener(s) 170 can be for further securing the cover 1 to the buckle portion 120 of the seat belt 100. Such fastener(s) can also include hook and loops such as VELCRO®, and the like.

Figure 10:
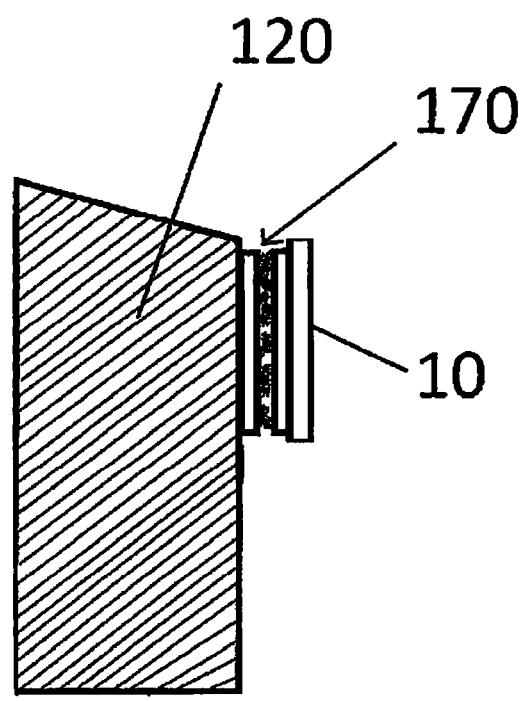
FIG. 10 is a side cross-sectional view of using a single peel and stick fastener for attaching the flap portion of the preceding Figures to the buckle portion.

FIG. 10 is a side cross-sectional view of using a single peel and stick fastener(s) 170 for attaching the base portion 10 of the preceding Figures to the buckle portion 120.

The novel cover 1 can also include a pouch or sleeve of various sizes to hold other items such as but not limited to a cell phone or wallet. Both the driver and the front passenger can have the reminder device attached to their seat belt buckles.

While the preferred embodiment refers to using a magnet as a detachable fastener to temporarily attach the flap to the metal tongue on a seat belt, other types of detachable fasteners, such as but not limited to hook and loop fasteners, snaps, and peel and stick tape, and the like, can also be used.

Various methods of covering the release button 130 can be used, including a bar that swings up and over the button or down to expose the buckle release button 130, and a flap 20 that attaches to the seat belt such as a seat belt cover via hook and loop fasteners (such as VELCRO®, snap fasteners, peel and stick fasteners. The seat belt buckle cover 1 can be of any materials beside fabric and can attach to the buckle via other fasteners, such as but not limited to besides VELCRO®.

Although the invention is described for reminding a driver of a child, baby or toddler is in a child seat, the reminder invention can be used whether or not the child, baby or toddler is in a child seat, and also used to remind the driver if a pet, etc. is still in the vehicle.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A seat belt reminder cover device in combination with a driver's seat belt having a buckle with an upper surface and a lower surface with a side slot opening and depressible release button between the side slot opening and the upper surface of the buckle, with the side slot opening for receiving and latching onto a loose metal tongue portion on the seat belt, the cover device comprising:
   an elongated base having a first end with a first fastener and a second end with a second fastener; and
   a flap extending outward from a side of the base between the first end and the second end of the elongated base, the flap having a stiff outer end and a bendable portion between the stiff outer end and the elongated base and a pre-attached magnet on a lower surface of the bendable portion of the flap, wherein the elongated base of the cover is wrapped over the upper surface of the buckle and held in place by the first and the second fasteners attached to one another, and with the flap extending over the depressible release button so that the magnet directly attaches the bendable portion of the flap directly to the metal tongue when the metal tongue is latched into the side slot opening of the buckle, and both the bent portion and stiff outer end of the flap is able to block access to the release button on the driver's seat belt buckle.

2. The cover device of claim 1, wherein the elongated base and the flap are formed from a fabric material.

3. The cover device of claim 1, further comprising:
   an ornament attached to an upper surface the stiff outer end of the flap.

4. The cover device of claim 3, further comprising:
   a picture of a child attached to the upper surface of the stiff outer end of the flap.

5. The cover device of claim 1, further comprising:
   a photograph of a child attached to an upper surface of the stiff outer end of the flap.

6. The cover device of claim 1, further comprising:
   a sound effect transmitter on an upper surface of the stiff outer end of the flap that emits a sound effect when activated.

7. The cover device of claim 1, wherein the first and second fasteners include:
   hook and loop fasteners.

8. The cover device of claim 1, wherein the first and second fasteners include:
   snap fasteners.

9. The cover device of claim 1, wherein the first and second fasteners includes:
   a peel and stick fasteners.

10. A seat belt reminder cover device for a driver's seat belt having a buckle with an upper surface and a lower surface with a side slot opening and depressible release button between the side slot opening and the upper surface of the buckle, with the side slot opening for and latching onto a loose metal tongue portion on the seat belt, the cover device consisting of:
    an elongated base having a first end with a first fastener and a second end with a second fastener;
    a bendable flap extending outward from a side of the base between the first end and the second end of the elongated base; and
    an object attached to an outer surface of the stiff outer end of the flap, the object being selected from a group consisting of a removable picture in a translucent sleeve, and a sound alarm, wherein the elongated base of the cover is wrapped over the upper surface of the buckle and held in place by the first and the second fasteners attached to one another, and with the flap extending over the depressible release button so that a magnet directly attaches the bendable flap directly to the metal tongue when the metal tongue is latched into the side slot opening of the buckle, and the bendable flap is able to block access to the release button on the driver's seat belt buckle.

11. A method of using a seat belt reminder device with a driver's seat belt in a vehicle in order to remind the driver of other occupants in the vehicle before unbuckling the driver's seat belt, the drivers' seat belt having a buckle with an upper surface and a lower surface with a side slot opening and depressible release button between the side slot opening and the upper surface of the buckle, with the side slot opening for receiving and latching onto a loose metal tongue portion on the seat belt, the method comprising the steps of:

provide an elongated base having a first end with a first fastener and a second end with a second fastener;

providing a flap extending outward from a side of the base between the first end and the second end of the elongated base;

providing a pre-attached magnet on a lower surface of the bendable portion of the flap;

wrapping the elongated base over the upper surface of the buckle;

fastening the elongated base about the buckle by the first and the second fasteners attached to one another;

positioning the flap over the depressible release button so that the magnet directly attaches the flap directly to the metal tongue when the metal tongue is latched into the side slot opening of the buckle; and blocking, access to the release button on the driver's seat belt buckle with the flap while it is attached to the metal tongue of the seat belt.

\* \* \* \* \*